Feb. 26, 1924.

T. H. WEST

EGG TURNER

Filed May 18, 1923

1,484,694

Inventor.
T. H. West
by Marks Clerk
Attys.

Patented Feb. 26, 1924.

1,484,694

UNITED STATES PATENT OFFICE.

THOMAS HENRY WEST, OF LYMM, ENGLAND.

EGG TURNER.

Application filed May 18, 1923. Serial No. 639,950.

*To all whom it may concern:*

Be it known that I, THOMAS HENRY WEST, a subject of the King of Great Britain and Ireland, and resident of Bridle Path, Lymm, in the county of Chester, England, have invented certain new and useful Improvements Relating to Egg Turners, of which the following is a specification.

This invention relates to incubators and has for its object to provide simple and convenient means for quickly turning or reversing the position of the eggs as required, and to keep the eggs separated or out of contact throughout the whole period of incubation.

The invention comprises a cellular drawer, shelf or receptacle having its cells, of which each is adapted to contain one egg, formed by strings, wires, cotton covered wires or their equivalent (hereinafter termed strings) extending between a wood or other frame and cardboard or other discs or end or abutment pieces mounted on and adapted to slide along the said strings, wires or the like.

Referring to the accompanying sheet of explanatory drawings:—

The same reference letters in the two views indicate the same or similar parts.

Figure 2:
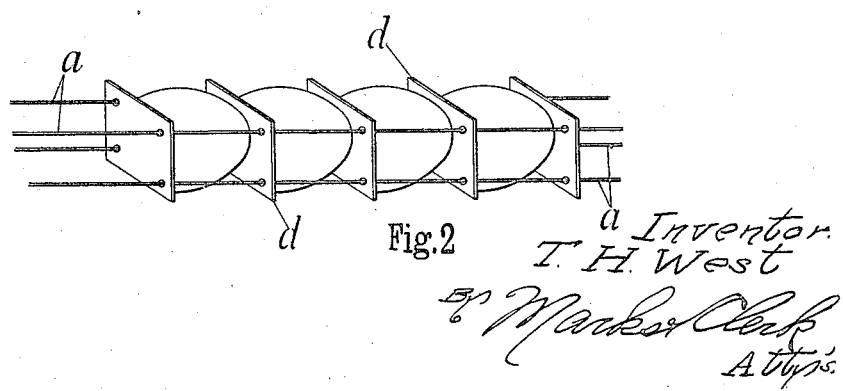
Figure 2 is a view showing the manner of threading the sliding end or abutment pieces upon the strings or wires for the formation of the cells.

In the example illustrated, the strings or wires as $a$ extend between the sides $b$ and $c$ of the wood or other frame to which they are attached in any convenient manner. The frame contains two rows or layers of strings $a$, placed respectively over and under each other, and two strings of each row, or four strings in all, form a cell group. Such a cell group is illustrated at Figure 2. The individual cells are formed by the cardboard abutments as $d$ in association with the strings $a$, the latter being threaded through the abutments $d$ in the manner indicated at Figure 2.

The eggs are inserted laterally between the strings $a$ and the abutments $d$ are then drawn close up to the eggs; the strings are thereby kept sufficiently taut between the abutments to prevent the eggs falling through the cells but without imposing any such pressure on any part of the eggs as would fracture or crack the shells.

Figure 1:
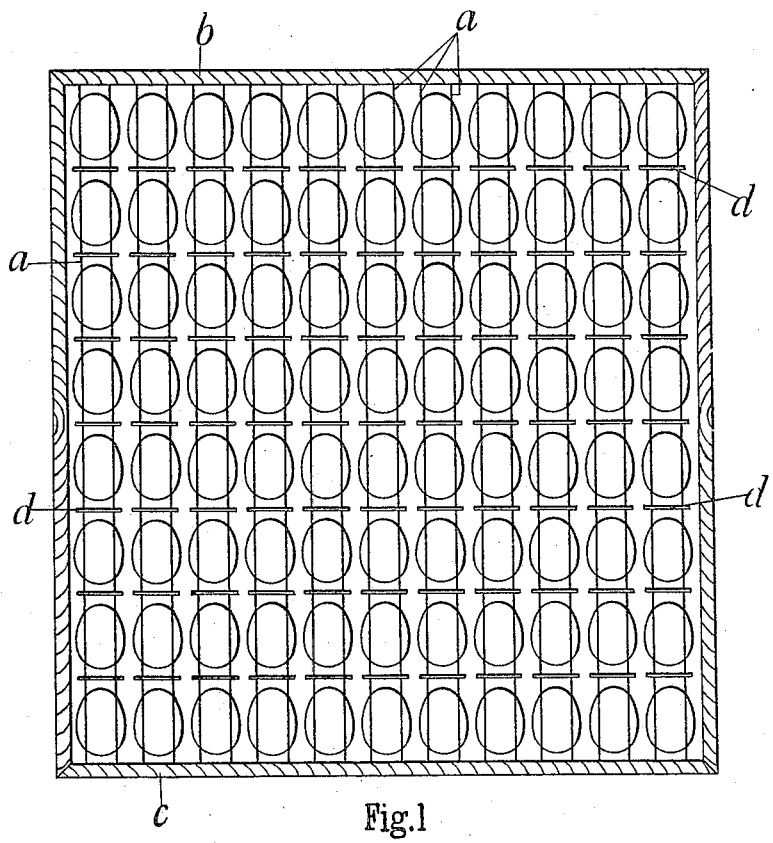
Figure 1 is a plan showing an egg drawer or container as constructed in one convenient form in accordance with this invention.

The drawer or receptacle shown at Figure 1 has an egg in each of its cells formed in the manner aforesaid, each egg being independent of or out of contact with its neighbour. Such a completely charged drawer can be turned over or reversed without disturbance of any of the contained eggs. In practice, an incubator drawer, shelf or receptacle of the cellular construction and charged with eggs as aforesaid can be readily withdrawn from the incubator, turned completely over, (thereby reversing the whole of the contained eggs) and re-inserted in the machine. The operation of reversing or turning the eggs can thus be performed in a few seconds.

I claim:—

In incubators, the combination comprising a frame, strings extending between the sides of said frame, and abutments slidable on said strings, the said strings and abutments forming a plurality of cells each providing accommodation for one egg, as set forth.

In testimony whereof I have signed my name to this specification.

THOMAS HENRY WEST.